Patented Aug. 9, 1932

1,870,815

UNITED STATES PATENT OFFICE

ROBERT B. LEBO, OF ELIZABETH, NEW JERSEY, ASSIGNOR TO STANDARD OIL DEVELOPMENT COMPANY, A CORPORATION OF DELAWARE

PURIFICATION OF ALCOHOL

No Drawing.   Application filed September 1, 1926.   Serial No. 133,084.

The present invention relates to the art of purifying organic compounds and more specifically to a method of refining alcohols by which products of a high degree of purity may be readily obtained. My process will be fully understood from the following description.

In the manufacture of alcohols by fermentation or other methods the crude alcohol is sometimes contaminated with malodorous compounds and sulphur containing impurities are particularly objectionable in alcohols derived from olefin hydrocarbons.

I have found that impurities contained in crude alcohols and particularly the sulphur containing products in alcohols derived from olefin hydrocarbons may be entirely eliminated by prolonged digestion with a small quantity of nitric acid, followed by neutralization and distillation over an excess of alkali.

My process is particularly applicable to alcohol higher than ethyl alcohol, such as isopropyl, amyl and butyl alcohols. In carrying out the process a small quantity of nitric acid, from 0.10% to 2.0% of 40° nitric acid or its equivalent is thoroughly agitated with the crude alcohol, and allowed to digest from 1 to 10 days depending on the nature and amount of impurities and the temperature. I prefer to operate at atmospheric temperature but temperatures from 0° C. to the boiling point of the particular alcohol may be used and the necessary time of digestion decreases as the temperature is raised. The mixture is then neutralized preferably with caustic soda, an excess of alkali added, and the alcohol is distilled. The distillation may be performed in a rectifying or fractionating still and the alcohols separated as desired.

As an example of my process, 5 to 10 gallons of 40° Bé. nitric acid is added to each 1,000 gallons of amyl alcohol, derived from olefin gases. The mixture is thoroughly agitated and allowed to stand for about 7 days at approximately 20° C. The mixture is then neutralized with caustic soda, an excess of alkali added, and the alcohol is distilled. The distillate boiling between 117° and 120° C., in the case of amyl alcohol, does not darken metallic silver in 12 hours at the temperature of a steam bath and presence of sulphur cannot be detected.

As an example of the treatment of isopropyl alcohol, 2 to 7 gallons of 40° Bé. nitric acid is added to each 1,000 gallons of isopropyl alcohol and after agitation the mixture is allowed to stand from 1 to 3 days at 60° C. The mixture is then neutralized, an excess of alkali added, and the alcohol is distilled, producing a distillate which boils at 80.5° C., does not contain an appreciable quantity of sulphur and will not tarnish metallic silver in 12 hours.

Any material or materials which will liberate nitric acid may be used in my process and concentration other than 40° Bé. may be used, if so desired provided that the requisite quantity of nitric acid be present. Mixtures of two or more alcohols may be treated by my method and finally either separated or not as desired.

My process is not to be limited by any theory advanced to explain the mechanism of the reaction nor by the examples which are to serve merely as illustrations of my method. I wish to be limited only by the following claims in which I intend to claim all novelty inherent in my process.

I claim:

1. A process for the purification of alcohols, comprising digesting the alcohol with nitric acid in an effective quantity and concentration so selected as to be equivalent to less than 2% by volume of 40° Bé. nitric acid, neutralizing the digested mixture with an alkali, and distilling the alcohol from the neutralized mixture.

2. A process according to claim 1, in which the temperature is maintained above 0° C. but below the boiling point of the alcohol from one to ten days during the digestion.

3. A process for the purification of alcohols, comprising digesting the alcohol with less than 2% by volume of 40° Bé. nitric acid in an effective quantity, neutralizing the digested mixture with an alkali, and distilling the alcohol from the neutralized mixture.

ROBERT B. LEBO.